E. A. BAYLES AND H. HIGHAM.
ELECTRICAL CONDENSER.
APPLICATION FILED DEC. 22, 1919.
1,393,602.
Patented Oct. 11, 1921.
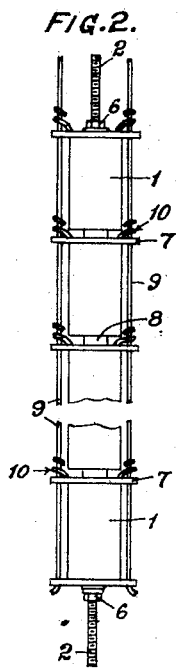
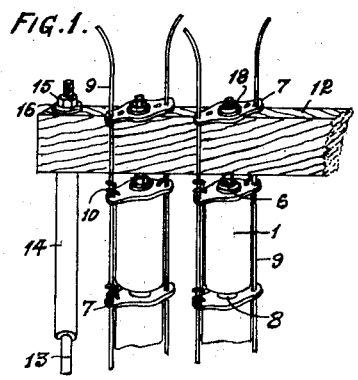
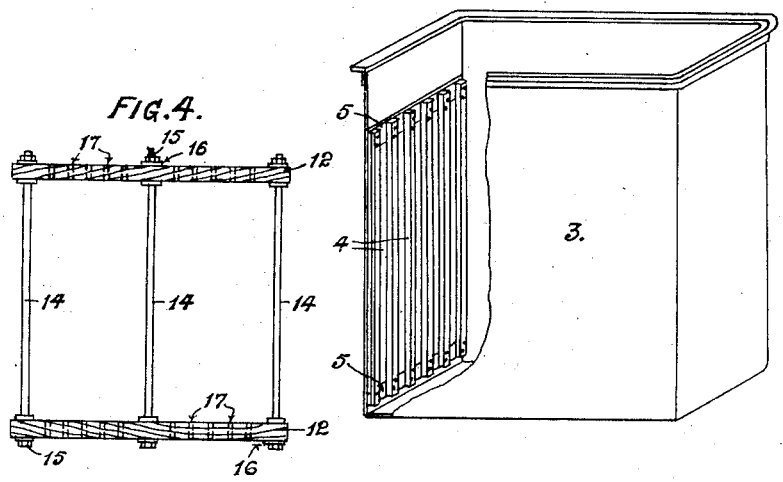
INVENTORS.
Ernest A. Bayles
Harold Higham
By
Attorney.

UNITED STATES PATENT OFFICE.

ERNEST ARTHUR BAYLES AND HAROLD HIGHAM, OF HELSBY, ENGLAND, ASSIGNORS OF ONE-THIRD TO ERNEST RICHARD ROYSTON, OF LIVERPOOL, ENGLAND.

ELECTRICAL CONDENSER.

1,393,602.  Specification of Letters Patent.  Patented Oct. 11, 1921.

Application filed December 22, 1919. Serial No. 346,778.

*To all whom it may concern:*

Be it known that we, ERNEST ARTHUR BAYLES and HAROLD HIGHAM, subjects of the King of England, and residing at Helsby, in the county of Chester, England, have invented Improvements in and Connected with Electrical Condensers, of which the following is a specification.

This invention has reference to electrical condensers, and more particularly that type in which the units are made of laminæ of paper or the like, and metal, foiled paper or the like, either coiled spirally, namely, rolled up, or it might be folded in laminæ. The invention has for its primary object and effect to provide improvements in connection with condensers which will be immune from the liability of breaking down or becoming damaged on high, as well as medium and low tension circuits, and under other conditions of such higher tension currents; and also to provide condensers by which large bodies of capacity, say from one hundred to several thousands of microfarads capacity, may be contained and formed into an apparatus or condenser of small dimensions, and which shall be secure against damage by vibration, and also securely connected to the circuit, and at the same time readily accessible for examination of the units or alterations of connections or otherwise; while a further object and effect is to provide a method of and means or arrangement for dealing with and handling of the units, after the drying and impregnation operations usually employed in making and preparing condenser units of the kind referred to, by which a minimum of exposure to the atmosphere is entailed.

The invention will be described with the aid of the accompanying drawings, which illustrate it, and in which Figure 1 is a perspective view showing the condenser units and manner of supporting same; Fig. 2 shows separately a complete battery of condenser units and their supporting member; Fig. 3 shows a tank or container in which they are disposed; and Fig. 4 a frame in which a multiplicity of condenser batteries are carried.

In this condenser, the bodies composed of coiled or folded laminæ of paper and metal, submerged in oil contained within a box or case; and in the case shown, the condenser bodies or units 1 (which are preferably cylindrical in form) are wound firmly on tubes of paper or the like—not shown—of small diameter, so that there is a tubular core so to speak running longitudinally through the center; and a number of the units are threaded on metal rods 2 of a small diameter, say for instance from $\frac{1}{8}$ to $\frac{1}{4}''$ diameter, and each rod may contain say up to 10, and the rods containing their battery of condenser units or bodies, are fixed in frames shown in Fig. 4, each of which carries a multiplicity of such rods with their threaded units, as illustrated in Figs. 1 and 2. The rods 2 are held in the frames in a vertical position under considerable tension, as hereinafter explained, and are thereby prevented from bending under the weight of the condenser units, or under vibration, or such usage or stresses as they may be subjected to, and should be able to withstand.

The complete condenser apparatus consists of a tank or container 3 having supports within it, and a multiplicity of the frames, with their batteries of rods each containing a multiplicity of condenser units; the frames being held by the supports within the tank or container 3, as shown in Fig. 3; and the tank is filled with oil in which the condenser units or bodies are submerged.

The tank container supports in the case shown consist of vertical grooves in parallel arrangement, and close together, formed by vertical parallel wooden bars 4 secured to horizontal bars 5 top and bottom extending down from near the top to the bottom of the tank. The tank will be provided with suitable insulated bus-bars and terminals.

In the construction shown, the rods 2 are screw threaded for a considerable distance at each end, as shown, and nuts 6 are screwed over them; and by that means units of each rod, when threaded, may be pressed together and held firmly in position.

Between each of the units, and on the upper ends of same, there are provided collars 7 of insulating material, such as fiber, ebonite, or the like, having wings or extensions on them, as seen more particularly in Fig. 1; and between these collars and the lower ends of the units, washers 8 are provided, and the rods 2 pass through these collars and washers.

Through holes in the wings of the collars 7, connecting wires 9 are passed, and to these the leading-in wires 10 to each separate condenser are soldered or otherwise connected.

The units thus arranged on the rods 2 with their connecting wires 9 connected up with the leading-in wires of the separate units, constitute a self contained battery, and the multiplicity of these batteries are arranged and secured in each of the carrier frames shown in Fig. 4.

These frames consist of hard wood upper and lower members 12, of a suitable size to withstand the pressure or strain to which they are put; and they are held together at their ends—and in the case shown at an intervening point—by metal rods 13, and distance tubes 14 between the wood bars 12, through which the rods pass; the rods being fitted with nuts 15 outside the bars 12, and large washers 16 between the tube ends and the inside surfaces of the bars 12, and between the nuts 15 and the outside of said bars.

When the nuts 15 are screwed up, the whole carrier frame constitutes a firm and strong rigid appliance.

The bars 12 are provided with a multiplicity of holes 17, suitably numbered to the rods that are to be fixed in the frame, and at such centers as will provide sufficient clearance between the units on the rods, and between the units of the tubular distance piece of the frame; and the lower and upper ends of the rods 2 are passed through them, and nuts 18 are screwed on to these ends, and the rods put under the desired amount of tension. Preferably one of the collars 7 is placed on the outer surface of the lower and upper bars 12, and a metal washer outside them, on to which the nuts 18 will be screwed up; and these collars may be nailed or screwed down on to the bars 12.

The rods 2 thus being in tension, and the units firmly fixed upon them, practically no movement out of place under any ordinary circumstances can take place, either in transit or *in situ*.

As will be seen, clearance is left between the nut above the top insulating piece of the upper unit, which holds the same in compression, and the bottom surface of the upper member of the frame, so that the nuts 6 and the rods 2 can be screwed up, and thus the putting of the rods under tension in their carrier frames is not interfered with.

By this invention the units which say are of one or two microfarads capacity, may be aggregated into quantities of a few hundred to several thousand, in a single tank or container of relatively small dimensions, within which they are firmly held in the position which they should occupy, and proof against damage or becoming defective though vibration, handling, transit or otherwise.

When the condenser units are required in multiple parallel series of connections, the connections must of necessity be different from those given above, but the general construction of the frame lends itself to easy and convenient variations of the connections.

In building up a condenser all the operations as mounting, threading and grouping the units are effected under oil; and in thus building up, after the units have been dried and impregnated in oil, the exposure to the atmosphere is reduced to a minimum, and the construction described lends itself in a very complete manner to this desirability.

In carrying out these building up operations in the manner referred to under oil, a large but shallow tank or tray is provided, and filled with the impregnating oil, which may be of any oil known to be suitable for such purposes, and especially oil suitable for condensers for use in circuits of high or medium electrical pressures, the condenser units being introduced from temporary containers in which they were impregnated in their manufacture in the known way, and removed therefrom without any exposure to the atmosphere; and the units 1 and their fittings are then threaded on the rods 2 under oil, in their correct order in a horizontal position in the tray with the fittings referred to, and held in position by the nuts 6 at each end as specified, which are screwed on to the rods. The connecting wires 9 are threaded through the holes in each wing of the insulating collars 7, and the individual wires from each condenser can be soldered on to these without lifting the bodies of the condensers out of the oil.

The frames are next introduced into the tray, with the top and bottom members 12 removed, or one of same; and the ends of the condenser carrying rods 2 are threaded through the holes 17 provided for them, and the frames built up and made secure; and lastly the nuts 18 for holding the rods 2 in tension are put on and tightened up.

The frame with its units is now a perfect, solid structure, which can be manipulated, and is in this condition transferred to the container, which has already been filled with the requisite quantity of oil, and slid quickly into the grooves or ways provided for it. The only time the condenser bodies need come into contact with the air is the few seconds needed to perform this transfer, and during these few seconds they are coated with a thick layer of the oil in which the building operations took place, and which has not had time to drain off.

When required a suitable transformer or inductance may be included with the capacity in the tank 3.

What is claimed is: —

1. An electrical condenser comprising a plurality of condenser units, each unit made up of a series of spaced longitudinally alined condenser bodies electrically connected, a container and means in the container for separately supporting the units.

2. An electrical condenser comprising a container or vessel, a plurality of batteries of condenser units carried by metal rods, and carrier frames by which the batteries are carried and held in position in the container or vessel, which is charged with oil; substantially as set forth.

3. An electrical condenser comprising a container, a series of unit frames removably supported in said container, spaced rods mounted in pairs in said frames, and condenser bodies arranged in spaced relation on each pair of rods.

4. In an electrical condenser in which the units are held in a container or vessel, a unit battery comprising a series of units and a pair of rods supporting all said units, and a carrier frame in which are fixed a multiplicity of batteries of units; substantially as set forth.

5. An electrical condenser comprising in combination a container or vessel with supports therein for the condenser bodies or units; a plurality of carriers comprising upper and lower members held together and constituting rigid frames, and adapted to be supported by the supporting means in the container or vessel; and batteries of condenser units, comprising a plurality of units proper and supporting metal rods threaded through same, the ends of these rods being fixed in the upper and lower members of the carrier frames; substantially as set forth.

6. The method of building up electrical condensers consisting in forming condenser bodies, impregnating the same with oil, and mounting the bodies in spaced rows in frames to provide a condenser unit, the mounting of the bodies being formed while all parts are immersed in oil.

In testimony whereof we have signed our names to this specification in the presence of two subscribing witnesses.

ERNEST ARTHUR BAYLES.
HAROLD HIGHAM.

Witnesses:
ERNEST RICHARD ROYSTON,
ELSIE E. JORDAN.